United States Patent
Smith et al.

(10) Patent No.: US 9,600,445 B2
(45) Date of Patent: *Mar. 21, 2017

(54) PRECISION MEASUREMENT OF WAVEFORMS

(71) Applicants: Paul Reed Smith Guitars Limited Partnership, Stevensville, MD (US); Ernestine M. Smith, Belle Haven, VA (US)

(72) Inventors: Paul Reed Smith, Annapolis, MD (US); Jack W. Smith, Belle Haven, VA (US); Frederick M. Slay, Okatie, SC (US)

(73) Assignee: Digital Harmonic LLC, Ellicott City, MD (US)

( * ) Notice: Subject to any disclaimer, the term of this patent is extended or adjusted under 35 U.S.C. 154(b) by 208 days.

This patent is subject to a terminal disclaimer.

(21) Appl. No.: 14/137,175

(22) Filed: Dec. 20, 2013

(65) Prior Publication Data
US 2014/0351302 A1 Nov. 27, 2014

Related U.S. Application Data

(63) Continuation of application No. 13/105,081, filed on May 11, 2011, now Pat. No. 8,620,976, which is a
(Continued)

(51) Int. Cl.
*G06F 17/14* (2006.01)
(52) U.S. Cl.
CPC ............ *G06F 17/14* (2013.01); *G06F 17/141* (2013.01)
(58) Field of Classification Search
None
See application file for complete search history.

(56) References Cited

U.S. PATENT DOCUMENTS

| 4,797,923 A | 1/1989 | Clarke |
| 4,884,229 A | 11/1989 | Dekker |

(Continued)

FOREIGN PATENT DOCUMENTS

| EP | 0 847 153 A3 | 7/1999 |
| EP | 1 184 670 A2 | 3/2002 |

(Continued)

OTHER PUBLICATIONS

U.S. Appl. No. 61/118,198, Smith et al., "Precision Measuring Matrix,", filed Nov. 26, 2001.
(Continued)

*Primary Examiner* — Michael D Yaary
(74) *Attorney, Agent, or Firm* — Sterne, Kessler, Goldstein & Fox PLLC

(57) ABSTRACT

A machine-implemented method for computerized digital signal processing including obtaining a digital signal from data storage or from conversion of an analog signal, and determining, from the digital signal, one or more measuring matrices. Each measuring matrix has a plurality of cells, and each cell has an amplitude corresponding to the signal energy in a frequency bin for a time slice. Cells in each measuring matrix having maximum amplitudes along a time slice and/or frequency bin are identified as maximum cells. Maxima that coincide in time and frequency are identified and a correlated maxima matrix, called a "Precision Measuring Matrix" is constructed showing the coinciding maxima and the adjacent marked maxima are linked into partial chains.

31 Claims, 11 Drawing Sheets

Related U.S. Application Data continuation of application No. PCT/US2009/064120, filed on Nov. 12, 2009.

(56) References Cited

U.S. PATENT DOCUMENTS

| | | | |
|---|---|---|---|
| 5,640,490 | A | 6/1997 | Hansen et al. |
| 5,780,759 | A | 7/1998 | Szalay |
| 6,766,288 | B1 | 7/2004 | Smith |
| 6,798,886 | B1 | 9/2004 | Smith et al. |
| 7,003,120 | B1 | 2/2006 | Smith et al. |
| 7,788,066 | B2 | 8/2010 | Taenzer et al. |
| 8,050,397 | B1 | 11/2011 | Read |
| 8,620,976 | B2 | 12/2013 | Smith et al. |
| 2001/0045153 | A1 | 11/2001 | Alexander et al. |
| 2003/0061035 | A1 | 3/2003 | Kadambe |
| 2003/0223354 | A1 | 12/2003 | Olszewski |
| 2004/0243657 | A1 | 12/2004 | Goren et al. |
| 2005/0265431 | A1 | 12/2005 | Pietila et al. |
| 2006/0111801 | A1 | 5/2006 | Weare et al. |
| 2006/0265218 | A1 | 11/2006 | Samadani |
| 2007/0286430 | A1 | 12/2007 | Thomas et al. |
| 2008/0019538 | A1 | 1/2008 | Kushner et al. |
| 2008/0034870 | A1 | 2/2008 | Kurt-Elli |
| 2008/0228470 | A1 | 9/2008 | Hiroe |
| 2009/0285409 | A1 | 11/2009 | Yoshizawa et al. |
| 2012/0041994 | A1 | 2/2012 | Smith et al. |
| 2013/0046805 | A1 | 2/2013 | Smith et al. |
| 2013/0191062 | A1 | 7/2013 | Smith et al. |

FOREIGN PATENT DOCUMENTS

| | | |
|---|---|---|
| JP | 3174777 B2 | 3/2001 |
| JP | 2003-131688 A | 5/2003 |
| JP | 2006-048195 A | 2/2006 |
| JP | 2006-251712 A | 9/2006 |
| JP | 2007-304445 A | 11/2007 |
| JP | 2008-310138 A | 12/2008 |
| JP | 2009-169439 A | 7/2009 |
| WO | WO 2008/056649 A1 | 5/2008 |
| WO | WO 2011/060130 A1 | 5/2011 |
| WO | WO 2011/060145 A1 | 5/2011 |

OTHER PUBLICATIONS

Casey, M.A., "Auditory Group Theory with Applications to Statistical Basis Methods for Structured Audio," Chapter 3, Feb. 1998, accessed on Jan. 6, 2011, accessed at http://alumni.media.mitedu/mke/thesis/; 172 pages.

De Haan, J. M., "A Survey on Methods for Time-Frequency Analysis," Master Thesis MEE-98-01, Mar. 1998, accessed on Jan. 6, 2011, accessed at http://www.bth.se/fou/cuppsats.nsf/all/afl cac2d8dea8bb9c1256def004e1c5e/$file/A%20Survey%20on%20Methods%20for%20Time-Frequency%20Analsysis.pdf; 106 pages.

"Double Exponential Smoothing," National Institute of Standards and Technology, Engineering Statistics Handbook, accessed via WayBackMachine, Oct. 17, 2000, pp. 1-2.

"Exponential Smoothing," accessed from Wikipedia.org, via WayBackMachine, Oct. 17, 2007; pp. 1-3.

Fladung, W., et al, "Application and Correction of the Exponential Window for Frequency Response Functions," Mechanical Systems and Signal Processing, vol. 11, No. 1, 1997; pp. 23-36.

Gasior, M., et al. "Improving FFT Frequency Measurement Resolution by Parabolic and Gaussian Interpolation," European Organization for Nuclear Research, CERN—AB Division, AB-Note-2004-021 BDI; 16 pages.

Jensen, K., "Timbre Models of Musical Sounds," Department of Computer Sciences at the University of Copenhagen (DIKU), 1999; pp. 1-223.

Özbek, M.E., et al., "Musical Note and Instrument Classification with Likelihood-Frequency-Time Analysis and support Vector Machines," European Association for Signal Processing (EURASIP), Dec. 2007, accessed on Jan. 6, 2011; pp. 941-945.

Regalia, P.A., et al., "The Digital All-Pass Filter: A Versatile Signal Processing Building Block," Proceedings of the IEEE, vol. 76, No. 1, Jan. 1988, pp. 19-37.

Sawada, H., et al., "Spectral Smoothing for Frequency-Domain Blind Source Separation," International Workshop on Acoustic Echo and Noise Control (IWAENC2003), Sep. 2003, accessed on Jan. 6, 2011], accessed at http://www.kecl.ntt.co.jp/icl/signal/iwaene03/cdrom/data/0070.pdf; pp. 311-314.

Vincent, E., "Musical Source Separation Using Time-Frequency Source Priors," IEEE Transactions on Audio, Speech and Language Processing, vol. 14, No. 1, Jan. 2006; 8 pages.

Wu, Z., al, "Ensemble Empirical Mode Decomposition: A Noise Assisted Data Analysis Method," Aug. 2005; pp. 1-49.

International Search Report and Written Opinion of the International Searching Authority directed to related International Patent Application No. PCT/US09/064120, mailed Jan. 12, 2010, from the International Searching Authority; 9 pages.

International Search Report and Written Opinion directed to related International Patent Application No. PCT/US10/56352, mailed Jan. 26, 2011, from the International Searching Authority; 11 pages.

International Search Report directed to related International Patent Application No. PCT/US10/056333, mailed on Jan. 21, 2011, from the International Searching Authority; 1 page.

International Preliminary Report on Patentablility and Written Opinion of the International Searching Authority directed to related International Patent Application No. PCT/US2010/056333, issued May 15, 2012, from the International Bureau of WIPO; 9 pages.

International Preliminary Report and Written Opinion of the International Searching Authority directed to related International Patent Application No. PCT/US2010/056352, issued May 15, 2012, from the International Bureau of WIPO; 6 pages.

Supplemental European Search Report directed to related European Patent Application No. 09851007.6-1507, mailed Oct. 6, 2014; 7 pages.

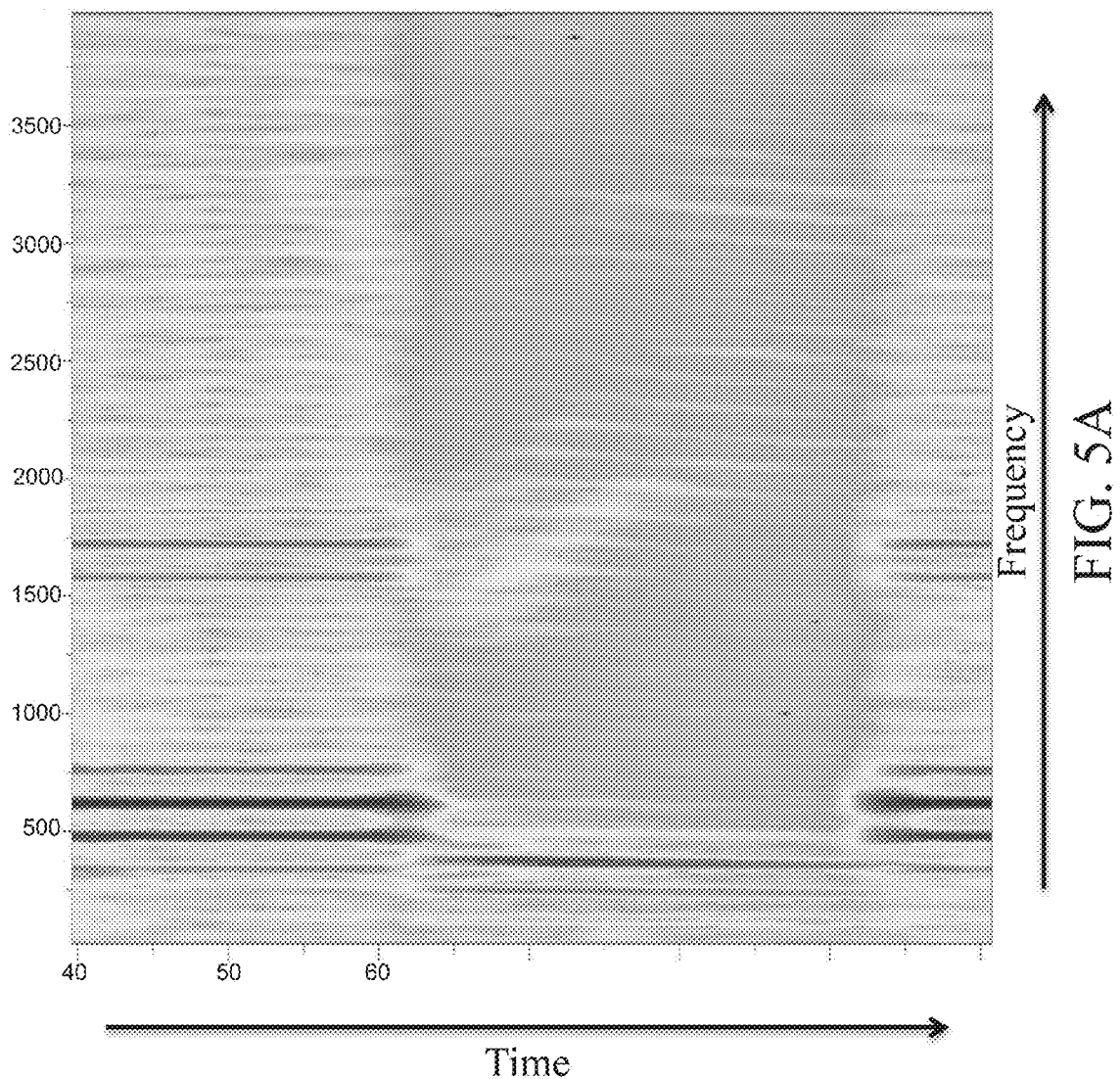

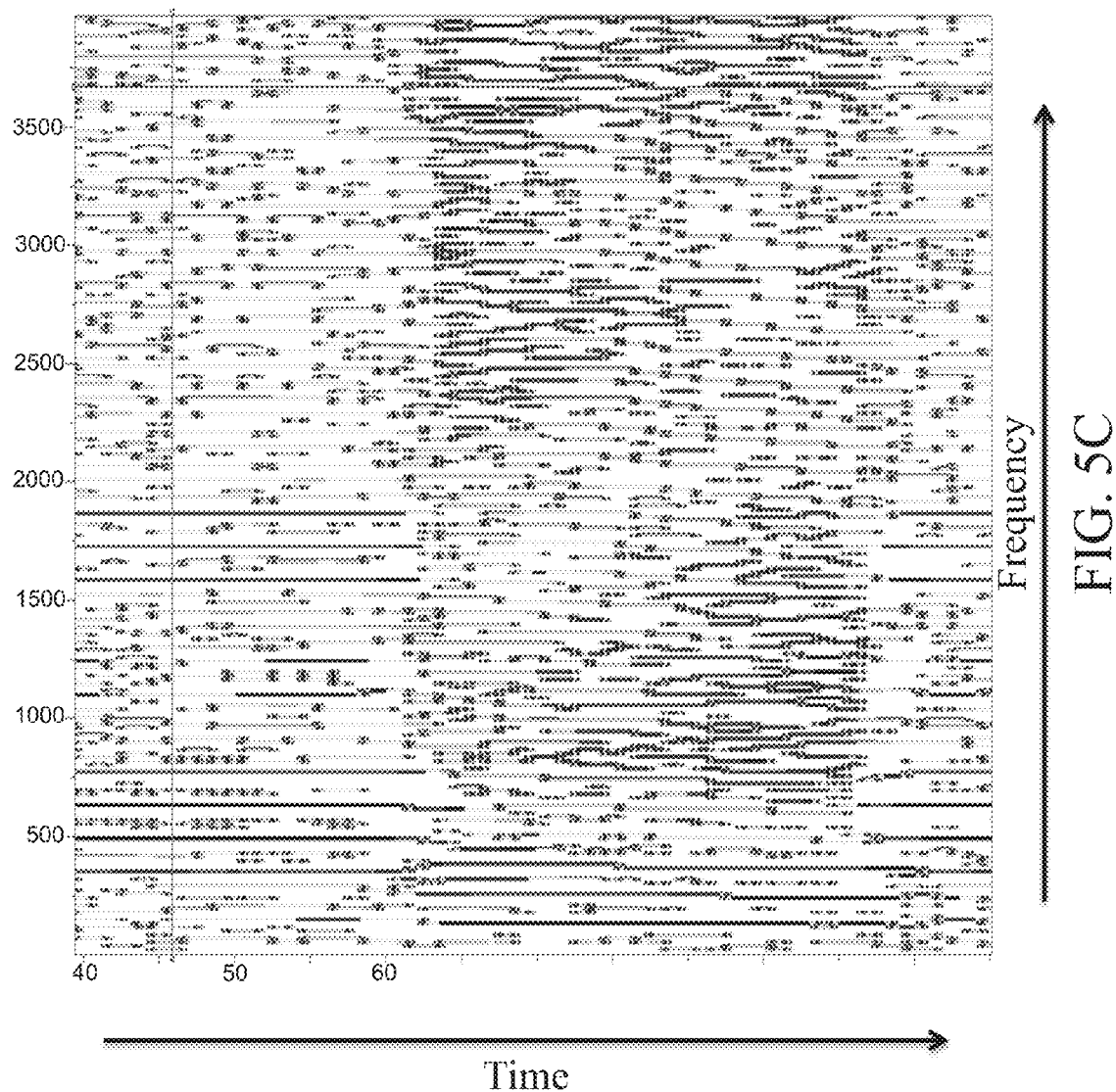

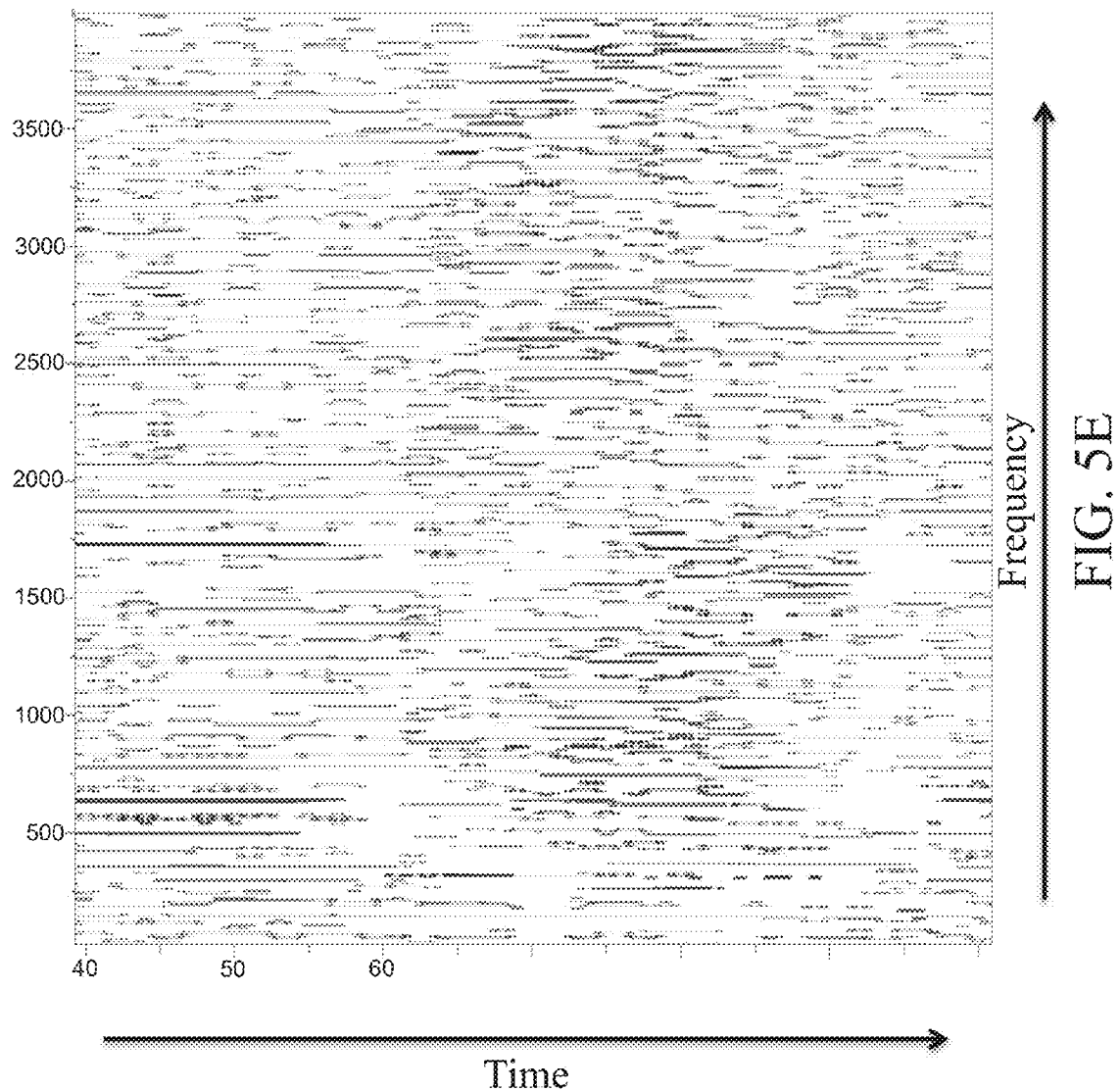

PRECISION MEASUREMENT OF WAVEFORMS

CROSS-REFERENCE TO RELATED APPLICATIONS

This application is a continuation of U.S. patent application Ser. No. 13/105,081, filed May 11, 2011, now U.S. Pat. No. 8,620,976, which is a continuation of International Patent Application No. PCT/US2009/064120, filed Nov. 12, 2009, now expired, all of which are incorporated herein by reference in their entirety.

FIELD OF THE INVENTION

The invention relates to the time-frequency-amplitude analysis and measurement of waveforms and compound waveforms. Note that the word "signal" is a popular synonym for the more general "waveform" and both may be used interchangeably here. A compound waveform consists of multiple waveforms (or signals) mixed together. While MOST of this document refers to the audio frequency range, a waveform for the purposes of this invention is not limited to any particular frequency range or complexity.

BACKGROUND OF THE INVENTION

Given a compound waveform, it is desirable to accurately measure the waveform and its components, which may have been spawned by several sources. This is difficult when the waveform includes signals produced by different sources overlapping in time and frequency, low energy signals eclipsed by higher energy signals, rapid changes in frequency, and/or rapid changes in amplitude. If these waveforms could be more accurately measured and analyzed, it would greatly increase our ability to understand what they contain and how to modify them.

Analysis of waveforms is traditionally accomplished in the time and frequency domains. Typically, these waveforms are first captured digitally as amplitude samples in time, then a series of transforms is used to measure the signals and the result is displayed in a matrix. A variety of techniques have been developed to extract frequency/amplitude information from the time-series data. However, representing how the frequency and amplitude change with respect to time can be challenging, particularly when there are abrupt frequency and/or amplitude changes, or signals from multiple sources occupy the same time and frequency regions.

One common transform for obtaining time, frequency, and amplitude information is the Discrete Fourier Transform (DFT). Unfortunately, there is a tradeoff between frequency and time resolutions resulting from the size (dimension) of the DFT. The time window inspected by a DFT is proportional to its dimension. Thus, a large dimension DFT inspects a larger time window than a small dimension DFT. This larger time window makes a large dimension DFT slow to react to dynamic changes.

Conversely, a large dimension DFT slices up the frequency range into finer pieces. The maximum frequency measured by the DFT is half the sampling rate of the digitized signal. A DFT of dimension X divides frequency range from 0 to the max into X/2 equal sized "bins." Thus, the size of each frequency bin in a DFT is equal to two times the sampling rate divided by its dimension.

So, higher dimension DFTs have higher frequency resolution but lower time resolution. Lower dimension DFTs have higher time resolution but lower frequency resolution. Because of this tradeoff, practitioners have sought modified DFTs or other alternative methods to accurately represent dynamic, time-varying waveforms with good resolution in both time and frequency.

Spectrograms, discrete wavelet transforms, Wigner-Ville, Gabor, and windowing techniques are just some of the techniques used to try to create more accurate time-frequency representations of dynamic signals that vary in time, frequency, and amplitude. Each technique has its own strengths and weaknesses: computational complexity (i.e., processing burden), artifacts/distortion, time accuracy and resolution, frequency accuracy and resolution, and amplitude accuracy and resolution. This invention is not a new transform technique, but a way of combining multiple transforms using any existing (or new) techniques.

This invention should not be confused with a vaguely similar but less sophisticated form of combining multiple FT data called spectral correlation. With spectral correlation, as found in the prior art, the same size FT is calculated, and the FT data are not taken simultaneously. Therefore, in contrast to this invention, spectral correlation does not take advantage of the simultaneous improvement in time and frequency resolution and accuracy. It also smears information over time, something this technique is designed to avoid.

The inventors have been issued several patents, which are hereby incorporated by reference. They are: Fast Find Fundamental Method, U.S. Pat. No. 6,766,288 B1; Method of Modifying Harmonic Content of a Complex Waveform, U.S. Pat. No. 7,003,120 B1; and Method of Signal Shredding, U.S. Pat. No. 6,798,886 B1. Provisional Application No. 61/118198 filed Nov. 26, 2008 is also hereby incorporated by reference.

SUMMARY

The invention provides a machine-implemented method for digital signal processing, comprising: obtaining a digital signal from conversion of an analog signal or from data storage; constructing one or more Measuring Matrices (MMs) comprised of cells containing the amplitudes for particular times and frequencies; marking maxima in the one or more matrices based on comparisons of the cell amplitudes; and identifying correlated maxima cells from multiple measuring matrices that coincide in time and frequency. A new matrix, called a Precision Measuring Matrix (PMM), is then generated with the correlated maxima marked. (Note: all these maxima are local maxima but, for brevity, we refer to them simply as "maxima." They may also be global maxima, but that does not matter here.)

Each measuring matrix is typically generated by repeated transformation of the input signal using, for example, a Fast Fourier Transform (FFT). Each transformation represents a portion of time, called a time slice, in the input signal and yields a row of cells, each cell corresponding to a frequency range, called a frequency bin. Each cell is populated with an amplitude, representing the signal strength for its corresponding frequency bin/time slice. Cells in each measuring matrix having maximum amplitudes along each time slice and/or frequency bin are identified and marked. Many methods for identifying maxima may be used, yielding many types of maxima. Maxima in various matrices and/or of various types that coincide in time and frequency are marked in a new matrix, called a "Precision Measuring Matrix." Adjacent correlated maxima in the PMM are then linked together as partial chains The obtaining, determining, identifying, selecting, marking and linking are implemented with a machine.

A maximum cell is identified by comparing its amplitude with the amplitudes of adjacent cells or by comparing the amplitudes of other specifically related cells. A cell is determined to be a simple maximum cell if the amplitude of the cell is greater than the amplitudes of certain adjacent cells. Other types of maxima (defined below) include: associated "little brother" maxima, angle maxima, and burglar maxima. If multiple maxima are found, for the same time slice and frequency bin (in different MMs and/or multiple types of maxima in the same MM/cell), then the maxima coincide, and, depending on specific test criteria, the corresponding cell in the PMM may be marked as a correlated maximum. The amplitude in each cell in the PMM is populated with a function of the values in the corresponding cells in the originating MMs (e.g., a weighted average).

Definitions

The following definitions are used herein.

FT: Fourier Transform—a method for computing the amplitudes of the spectrum for a waveform.

DFT: Discrete Fourier Transform—an algorithm that computes the amplitudes of the spectrum for a discrete (digitized) waveform. The DFT output can be a complex number or just the real amplitude. Many of the disclosed embodiments of this invention only need the real amplitude. Unless specifically described as complex, all references to DFTs herein are for DFTs with real output.

FFT: Fast Fourier Transform—a fast running DFT method that is so popular that its name is often used synonymously with DFT. DFT and FFT are used interchangeably herein.

FIR: Finite Impulse Response—as used herein, FIR refers to an FIR filter. A collection of FIRs may produce time and frequency information similar to that from an FFT with real amplitude output.

IIR: Infinite Impulse Response—as used herein, IIR refers to an IIR filter. A collection of IIRs may produce time and frequency information similar to that from an FFT with real amplitude output.

Window: The portion of time used by a Fourier Transform (or equivalent technique). In a DFT the window size (in samples) is known as the dimension of the DFT. For example, if a signal is digitized with 8000 samples per second, a DFT with a dimension of 4000 will operate on 4000 samples (one half-second) of data.

Windowing technique: A popular DFT method whereby the samples within the window are not all treated equally. For example, a simple DFT with dimension 4000 will simply transform the 4000 samples. With a windowing technique, the 4000 samples will be modulated to give more weight to the samples in the middle and less weight to the samples at the beginning and the end. Windowing techniques are designed to reduce the sidelobes/artifacts in the DFT's frequency response.

dB: decibel—logarithmic ratio of measurement used in, for example, acoustics and electronics measurements and calculations.

dBFS: dB Full Scale—DB relative to the maximum peak level in the digital representation.

Time slice: A portion of time. A time slice may, for example, be represented by an FFT run on a particular time window of data. However, the window will typically be much larger than the time slice it represents and centered on the time slice. The size of the time slices is determined by the spacing between successive FFT runs, not by the size of the window. For a digitized signal with 8000 samples per second, if a new FFT is run every 8 samples, then the time slices are 8 samples (1 millisecond) wide. The FFT window might be 4000 samples (a half-second or 500 time slices) wide.

Frequency bin: A small range of frequencies (e.g. 1702-1704 Hz)

Cell: A unit in a matrix. Typically, a cell represents a frequency bin in a time slice and contains an amplitude in dBFS.

MM: Measuring matrix—A matrix of cells representing the spectral amplitude of a waveform over time. A measuring matrix is generated by repeated FFTs (or other transform or the equivalent). Each FFT creates, for its time slice, a row (or column) of cells—one cell for each frequency bin. The amplitude in each cell is the amplitude for that frequency bin in that time slice. The cells are then inspected and marked, as appropriate, as maxima. A measuring matrix can be of infinite length, when processing a continuous signal in near real time. For a limited time waveform, a measuring matrix can be of finite length. Likewise, at least two measuring matrixes may be referred to as measuring matrices.

Maximum cell: A cell marked as having one or more types of maxima.

Simple maximum cell: A cell whose amplitude is greater than the cells immediately adjacent. If a cell's amplitude is greater than that of the cells in the same frequency bin that are just before it and just after it in time, the cell is a time peak simple maximum. If a cell's amplitude is greater than that of the cells in the same time slice that are just above it and just below it in frequency, the cell is a frequency peak simple maximum. A single cell can be both a time and frequency simple maximum. Time peak and frequency peak simple maximum cells may be distinctly marked or may be treated as synonymous and just called "simple maximum cells," or, "simple maxima," or, "local maxima" for short.

Associated maximum ("little brother") cell: A cell adjacent to a simple maximum whose amplitude is within a designated threshold of the simple maximum's and also greater than that of the cell on the other side. If a cell is a time peak simple maximum, the cells in the same frequency bin that immediately precede it and succeed it are candidates for associated maxima. In an exemplary embodiment, if the amplitude in the candidate cell preceding a simple maximum is within 2 dB of the simple maximum's amplitude and also greater than the amplitude of the cell that precedes it, then it would be marked as a little brother. Analogously, if a cell is a frequency peak simple maximum, the cells in the same time slice that are just above and below the simple maximum in frequency are candidates for associated maxima. In an exemplary embodiment, if the amplitude in the candidate cell just above the simple maximum in frequency is within 3 dB of the simple maximum's amplitude and also greater than the amplitude of the cell just above it in frequency, then it would be marked as a little brother. The dB thresholds for little brothers adjacent in time need not be the same as for little brothers adjacent in frequency. Time and frequency little brothers may be distinctly marked or may be treated as synonymous and marked simply as little brothers. A single cell can be both.

Angle maximum cell: A cell where the difference in amplitude between it and the adjacent cells on opposite sides changes more than a given threshold. In an exemplary embodiment, if a cell is 4 dB greater than the cell, in the same frequency bin, that immediately precedes it in time but is only 1 dB less than the cell that succeeds it, the 3 dB difference qualifies it as an angle maximum (specifically, a time angle maximum). Frequency angle maximum are found analogously by comparing a cell's amplitude with that of the cells, in the same time slice, just above and below it in frequency. Angle maxima may be distinctly marked as frequency angle maxima and/or time angle maxima or may be treated as synonymous and marked simply as angle maxima. A single cell can be both.

Burglar maximum cell: A maximum cell where the maximum is detected by measuring amplitude changes as a signal peak enters and exits a DFT window. An energy peak within a frequency bin will affect the amplitude of all cells in that bin where the peak is within the cell's transform window. If the transform window is, for example, 500 time slices wide, then the peak will enter the window 500 time slices (cells) before it exits. By comparing the increase in amplitude to the decrease 500 time slices later, and also comparing them both to a specified threshold, a burglar maximum may be declared. The cell(s) in the middle are then marked. If the peak is longer than one time slice in duration, the energy will ramp up over a number of cells (time slices or rows) and ramp back down similarly 500 cells later, and multiple cells in the middle will be marked as burglar maxima. Thus, unlike the other types of maxima, a burglar maximum is not detected by comparing a cell with its immediate neighbors. Since the window can be much wider than a single time slice, the amplitude changes may be seen in cells far removed from the cell(s) to be marked. Also, unlike the simple, associated and angle maxima, a burglar maximum can only exist as a time maximum; there is no analogous frequency maximum.

Correlated maximum cell: a cell in a PMM corresponding to maximum cells in multiple MMs. When maximum cells in multiple MMs overlap (i.e., partially or fully coincide) in time and frequency they are said to be correlated and a cell in the PMM which corresponds in time and frequency to the overlap in these correlated cells is called a correlated maximum cell. (Note: "coincident" or "corresponding" are equivalent terms.)

Partial: A marked maximum cell or a cluster of related marked maximum cells (e.g. a simple maximum and its little brothers).

Partial chain: A collection of partials linked together. A partial chain may include one or more partials per time slice. A partial chain may traverse the time slices as a straight line, a curved line and/or an angled line. Partial chains are considered to be linked cells—linked because of their proximity.

DnMM: Dimension N measuring matrix—A measuring matrix with N frequency bins. For example, a D500MM is a measuring matrix with 500 frequency bins. The time dimension, being potentially infinite, is not used in naming a MM.

PMM: Precision measuring matrix—A MM with correlated maxima marked.

DnPMM: Dimension N precision measuring matrix.

Signal: Any detectable physical quantity or impulse from which messages, data or information can be obtained (e.g., surmised or extracted). As explained above, the invention relates to the time-frequency-amplitude analysis and measurement of "waveforms" and "compound waveforms." The term "signal" is a popular and conventionally recognized synonym for the more general term "waveform" and both may be used interchangeably within this application. Thus, the term "compound waveform" may be recognized as being composed of multiple waveforms (or signals) mixed together.

BRIEF DESCRIPTION OF THE DRAWINGS

The patent or application file contains at least one drawing executed in color. Copies of this patent or patent application publication with color drawing(s) will be provided upon request.

FIGS. 5A and 5B show exemplary visualizations of two measuring matrices obtained with separate FFTs on the same data according to an exemplary embodiment of the invention.

FIGS. 5C and 5D show exemplary visualizations of the maxima determined for the two measuring matrices of FIGS. 5A and 5B, respectively, and obtained by an analysis engine according to an exemplary embodiment of the invention.

FIG. 5E shows an exemplary visualization of the Precision Measuring Matrix output data determined from the maxima shown in FIGS. 9C and 9D according to an exemplary embodiment of the invention.

DETAILED DESCRIPTION OF THE DISCLOSED EMBODIMENTS

Figure 1:
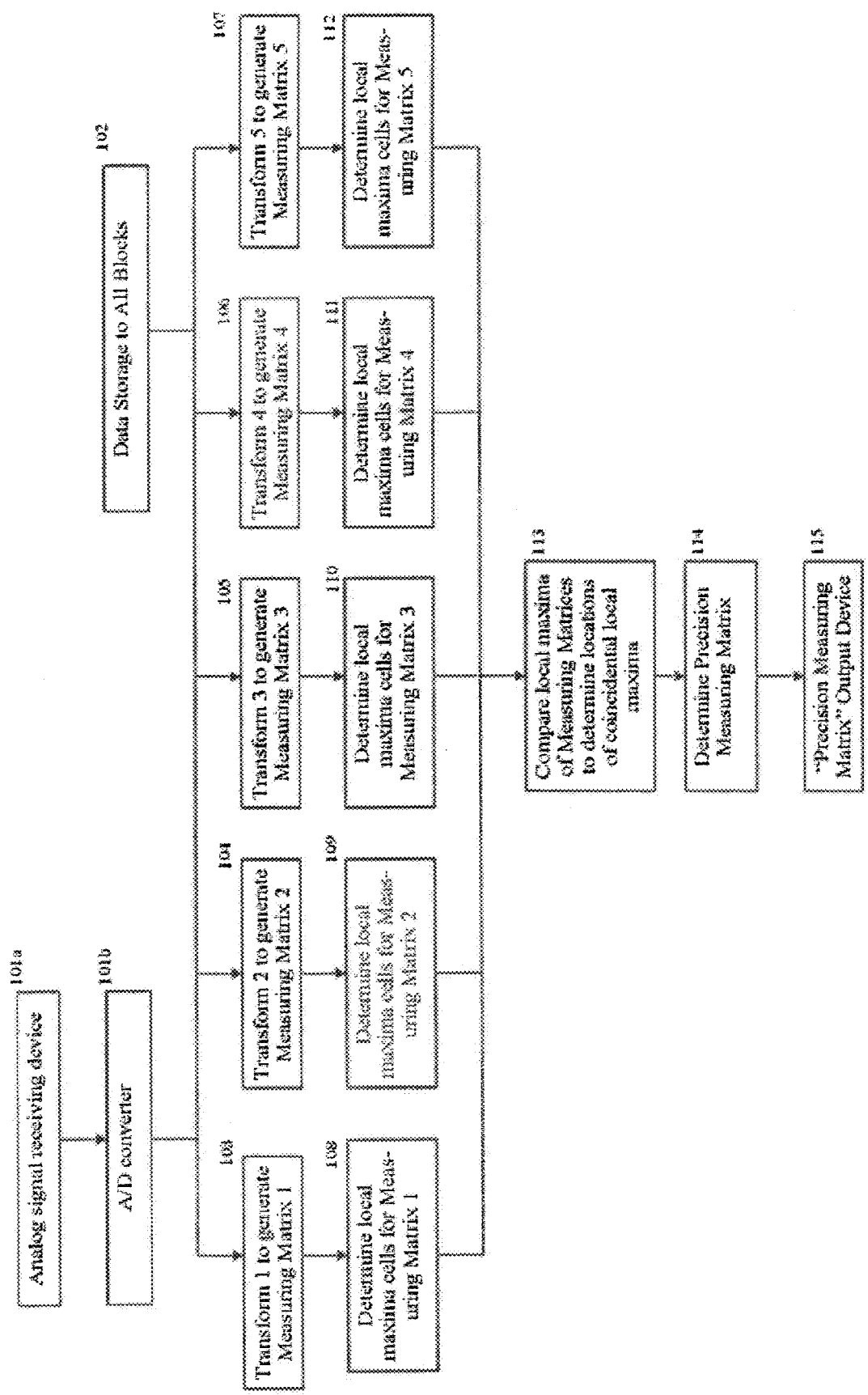
FIG. 1 shows a schematic diagram according to an exemplary embodiment of the invention.

Exemplary embodiments of the invention create a "Precision Measuring Matrix" (PMM) as part of a new dynamic computer machine process that produces accurate amplitude and frequency information in time. The PMM is a new kind of highly useful data and output that can be more precise than prior art.

Compared to the problems associated with conventional techniques, certain exemplary embodiments of the invention advantageously have high resolution and accuracy measurements of instantaneous frequency and amplitude of a time series signal. Embodiments of the invention may accomplish this by combining multiple, simultaneous measuring matrices of varying sizes (marking the cells by finding maximum cells and marking them) and then searching the MMs to correlate the maxima. As explained above, the smaller-sized transforms provide better time resolution while the larger-sized transforms provide better frequency resolution. For this reason, usually two or more measuring matrices (differing in time and frequency resolutions) are used to build the overall PMM. Additional measuring matrices (e.g., ones with the same dimension but different transforms or different windowing techniques) may be used to provide even greater resolution and accuracy. Multiple types of maxima (even in a single MM) may also be used to find correlated maxima for the PMM. Adjacent correlated maxima will be linked into chains called partial chains. This linking is accomplished by connecting any two maximum cells that are in adjacent or identical in frequency bins and also in adjacent or identical time slices.

In one basic embodiment, two MMs are created using FFTs of different dimensions and simple maxima and little brothers (in both time and frequency) are marked with a 2 db threshold for the little brothers. In this embodiment, all four types of maxima (time and frequency, simple and little brother) are treated equally and cells are marked simply as "maxima." The PMM is then created by comparing cells in the two MMs with corresponding time and frequency and marking maxima in the PMM where corresponding cells both have maxima. The cells in the PMM are populated with the average of the amplitudes of the corresponding cells in the original MMs.

For example, assume a digitized audio signal of 8000 samples per second. In this embodiment, one MM might be produced by performing an FFT of dimension 1000 every 80 samples (every 10 ms). Each FFT represents a time slice 10 ms long. The resulting amplitudes of each FFT are recorded as one row in this MM. The cells that qualify as simple maxima and little brothers are then marked as maximum cells.

Note that an FFT of dimension N (or other equivalent technique) produces a MM with N/2 frequency bins. Thus, a MM produced by a FFT of dimension 1000 is a D500MM. Note also that the maximum frequency possible is always equal to half the sampling rate—4000 Hz in this example with a sampling rate of 8000. Dividing the frequency range of 0 to 4000 Hz into 500 equal parts yields frequency bins 8 Hz wide (−4-4 Hz, 4-12 Hz . . . 3988-3996 Hz). The cells that qualify as simple maxima and little brothers are then marked as maximum cells.

Next, A D2000MM is produced by performing an FFT of dimension 4000 every 80 samples. The resulting amplitudes of each FFT are recorded as one row in the D2000MM. The frequency bins of the D2000MM are 2 Hz wide (−1-1 Hz, 1-3 Hz, 3997-3999 Hz). The cells that qualify as simple maxima and little brothers are then marked as maximum cells.

Note that the D2000MM is four times as accurate in frequency as the D500MM. Conversely, the D500MM is, by virtue of its shorter window, four times as accurate in time as the D2000MM. Specifically, the D2000MM is computed from a time window of 4000 samples (spanning a half-second—50 rows or time slices), while the D500MM is computed from a time window of 1000 samples (spanning only an eighth-of-a-second—12.5 rows or time slices).

To simultaneously get the time resolution of the D500MM and the frequency resolution of the D2000MM, we correlate the two and build a D4000PMM. Since each frequency bin in the D500MM is four times as wide as a frequency bin in the D2000MM, identifying which bin in one corresponds to a bin in the other can be confusing. To simplify this (both in the actual machine and in this explanation) we expand the D500MM and the D2000MM to produce corresponding bins. To do this, we divide each cell in the D500MM into eight equal parts. In each row in the D500MM, each cell is divided up. The cell for −4-4 Hz is split into 8 cells (−4-3 Hz, −3-2 Hz, −2-1 Hz, —1-0 Hz, 0-1 Hz, 1-2 Hz, 2-3 Hz and 3-4 Hz). Each of the new cells retains the amplitude and the maxima markings of the original −4-4 Hz cell. The other cells are divided up the same way. Thus, since the rows (time slices) already corresponded exactly in time, each cell in the expanded D500MM corresponds exactly (in time and frequency) with a cell in the similarly expanded D2000MM and building the D4000PMM is now straightforward.

The amplitude in each cell in the D4000PMM is populated with the average of the amplitudes of the corresponding cells in the D500MM & D2000MM. Any function of the two amplitudes is permissible but in this embodiment, the amplitude of a cell in the PMM is the simple average of the energies of the cells in the two originating MMs. Each cell is marked as a maximum if the corresponding cells in both MMs are marked as maxima.

Note that how the rows of these MMs correspond exactly in time is common knowledge but still worth explaining. The very first row in the D2000MM is created from samples 1-4000 in the digitized input. The first row of the D500MM is generated from samples 1501-2500 so as to be centered the same. (The center is exactly 2000.5). Since the time slices are 80 samples wide, the time slice represented by these rows may be thought of as samples 1961-2040 (also centered on 2000.5). The second row (time slice) would be 80 samples later. The second row of the D2000MM would be generated by a FFT on samples 81-4080 (centered on 2080.5), the D500MM on samples 1581-2580 (also centered on 2080.5). The time slice may be thought of as samples 2041-2120 (again, centered on 2080.5). Notice that the time slices do not overlap—by definition.

Other embodiments of this invention may be produced by variations on this one. The time maxima could be dropped and only frequency maxima used. Conversely, only time maxima could be used. The little brother threshold could be changed from 2 dB to any other value or the little brothers could be eliminated entirely. More that two MMs could be created and correlated. When more than two MMs are used, the agreement between all of them need not be universal. For example, if five different measuring matrices are used, three out of five maxima at the same time and frequency might be required to identify a correlated maximum. A correlated maximum may also be defined as a maximum in the highest dimension MM, which coincides with a maximum in any other MM. The criteria for a correlated maximum may vary by application or signal characteristics but must involve the agreement in time and frequency of two or more maxima. Also, a correlated maximum may be determined differently for different frequency ranges. For example, for low frequencies, larger dimension measuring matrices may be needed for the increased frequency resolution. Conversely, for high frequencies, smaller dimension measuring matrices may work fine.

Any combination of these variations may be used in an exemplary embodiment. Also, any windowing technique might be used. In another exemplary embodiment, multiple MMs are generated using the same dimension FFT but different windowing techniques. Maxima are then marked in these MMs (possibly with different marking criteria), and then the MMs are compared to find correlated maxima and build the PMM. In another exemplary embodiment, multiple MMs are produced, using both different dimensions and different windowing techniques. For example, a D500MM and D2000MM might be produced without a windowing technique and another D2000MM produced with a Hamming window. These three MMs are then correlated to produce the PMM. The possible combinations are endless.

In another exemplary embodiment only a single MM is created. In this embodiment, a D4000MM is produced with no windowing technique. Frequency peak simple maxima are identified and marked. Also, burglar maxima are identified and marked. Any cell marked both as a frequency peak and as a burglar maximum is a correlated maximum, and a PMM is created with those correlated maxima marked.

Other embodiments of this invention may be produced by variations on this one. The MM could have a different dimension than 4000. Deconvolution and/or windowing techniques could be used to enhance the frequency resolution of the MM. The little brothers could be allowed. The little brother threshold, instead of being a constant number of dB, could be made a function of characteristics of the burglar maximum. Specifically a "strong" burglar maximum (one showing a greater slope as the signal peak enters and exits the window) could trigger a different little brother threshold than a weak burglar maximum.

In another exemplary embodiment, the cells of the MMs could be populated with complex numbers, using full complex number FFTs, and the maxima identification could be based on both the amplitude and the phase in the cells. For example, the little brother and angle maxima thresholds could include a phase component Larger or smaller phase shifts could be considered more indicative of a maximum.

In another exemplary embodiment, some or all of the FFTs are replaced by multiple IIRs or FIRs. Each frequency bin uses a separate FIR or IIR. The general technique of using filters, instead of actual transforms from one domain to another, to identify a frequency spectrum is known, but this method is computationally more intensive, in order to center the time slices in the MMs identically, time-delay compensation to adjust group-delay variations in the frequency responses of the filters may be used. The MMs created from FIRs and IIRs are used the same as MMs created from FFTs.

Moreover, it should be understood that FFTs may be replaced with the use of other types of transforms that provide the same or similar type of computational or analytic characteristics. A Discrete Wavelet Transform (DWT) is one example of such a transform. It is conventionally understood that such transforms can be viewed as a rotation in function space to a different domain. Further, FFTs and DWTs and the like have basis functions that are localized in frequency. Thus, exemplary embodiments may be utilized with various types of transforms that provide the functionality described herein.

Exemplary embodiments may combine all of the above, multiple types of maxima in multiple MMs created with different dimension FFTs and/or other transforms and/or different windowing techniques and/or banks of FIRs or IIRs. The maxima are then correlated for corresponding frequency bins and time slices. When using FIRs or IIRs, longer time slices may be used to reduce the computation load. In this case, a single row (time slice) in a MM produced by an FIR or IIR, might correlate in time with two or more rows in a MM produced by an FFT. To facilitate simple correlation, matrices could be expanded in time analogously to how matrices were expanded in frequency—or the correlation could be done without this device. Also, while the identification of maximum cells is described herein as "marking," the cells, that is not literal in some exemplary embodiments. Any manner of tracking which cells are maxima and which are not may be used. In an exemplary embodiment, separate parallel matrices (or arrays) contain the maxima designations. Thus, a MM or a PMM may not literally refer to a single matrix or array in a machine but may literally refer to a set of parallel matrices or arrays that collectively contain the amplitude and maxima information described herein.

FIG. 1 shows a schematic diagram according to an exemplary embodiment of the invention. Analog signal receiving device 101a captures a physical analog signal (which, as explained above, may include one or more waveforms); therefore, may be considered a physical analog device. The analog signal receiving device 101a may be, for example, a tape player playing a tape, a microphone, video camera, or other transducer, etc. An analog-to-digital (A/D) converter 101b converts the physical analog signal to a digital format. In an exemplary embodiment, the A/D converter 101b is embedded, for example, on a digital audio machine that feeds a digital audio workstation (DAW). The digital format is produced, for example, using 16-bit quantization and sampling frequency of 8 KHz. Each bit of quantization may afford a dynamic range of approximately 6 dB. Thus, the example 16-bit quantization may lead to a total dynamic range of approximately 125 dB, sufficient for some audio applications. Other quantization options are available, including but not limited to 32-bit and 24-bit. The quantization may also be single-bit using over sampling and sigma-delta modulation, as commonly used in devices such as CD-ROMs. The analog signal receiving device 101a and the A/D converter 101b can be the same device or separate devices.

In an exemplary embodiment, instead of providing the digital signal via the analog signal receiving device 101a and the A/D converter 101b, the digital signal can be provided by data storage 102 which stores the digital signal. The data storage 102 may be any kind of data storage, for example, hard disk drives, a network attached storage (NAS) device, a flash drive, etc. However, the data storage 102 is not limited to these particular examples. The data storage 102 may include other existing or future developed data storage devices without departing from the scope of the current invention.

Many types of signals may be processed by the exemplary embodiments. For example, the digital signals provided may be digitized analog signals from the audio spectrum, video spectrum or other spectrums, or may originate in a digital form.

In blocks 103 to 107, the digital signal is either received from the analog signal receiving device 101a and the A/D converter 101b or from the data storage 102 and is transformed to generate measuring matrices. The transform might be, for example, an FFT. For example, in each block 103 to 107, an FFT is performed for the digitalized physical analog signal with different dimension and corresponding spectral resolutions. The functionalities of the transforms may also be accomplished by a bank of FIR or IIR band-pass filters having center frequencies appropriately spaced across the spectrum of interest. Usually, two or more such transforms (or filter bank sets) are performed. FIG. 1 shows five such transforms, although any number may be used.

In blocks 108 to 112, maximum cells in each measuring matrix are identified by various methods of comparing amplitudes of cells in each measuring matrix. When processing measuring matrices for real time waveforms, one row or a few rows may be processed at a time. Some data is retained from rows processed previously for comparison to the rows currently being processed.

In block 113, the identified maxima in each measuring matrix are compared in time and frequency to find correlated maxima. These comparisons may involve maxima of the same type or of different types. In an exemplary embodiment, these comparisons may involve maxima of different types from the same transform/block (e.g., block 108). For example, the burglar maximum cells from block 108 could be compared to the simple and associated maximum cells from blocks 108 through 112. Any combination of comparisons is possible.

In block 114, the precision measuring matrix is built. The identified locations of the coincidental time slices and the frequency bins from block 113 form correlated maxima, which are marked in the PMM. The amplitudes in the cells of the PMM may be populated with any function of the amplitudes contained in the corresponding cells in the originating measuring matrices (for example, an average, a weighted average, a median, etc.). This function could be simple (e.g., only using the amplitude from one of the originating matrices) or complex (e.g., sensitive to whether a cell in each originating matrix is a maximum, and which type of maximum).

In an exemplary embodiment, the output device 115 may be a data storage or transmission device or a visualization device having a user interface to visualize the measured signal. A visualization device is, for example, a display device or a printing device. Example display devices may include liquid crystal displays, projection monitors, etc. Example printing devices may include toner-based printers, liquid ink-jet printers, inkless printers, etc. Other interim results of the exemplary embodiments may also be provided to the output device 115. In an exemplary embodiment, the output device 115 may be data storage to store the PMM. In an exemplary embodiment, the output device 115 may be a transmission device to send the PMM to another device. These results may then be used by a signal processor or other device to modify the original waveform. In an exemplary embodiment, the output device may include both data storage and a visualization device so that the signal processor can be manually adjusted to achieve the desired result.

Figure 2:
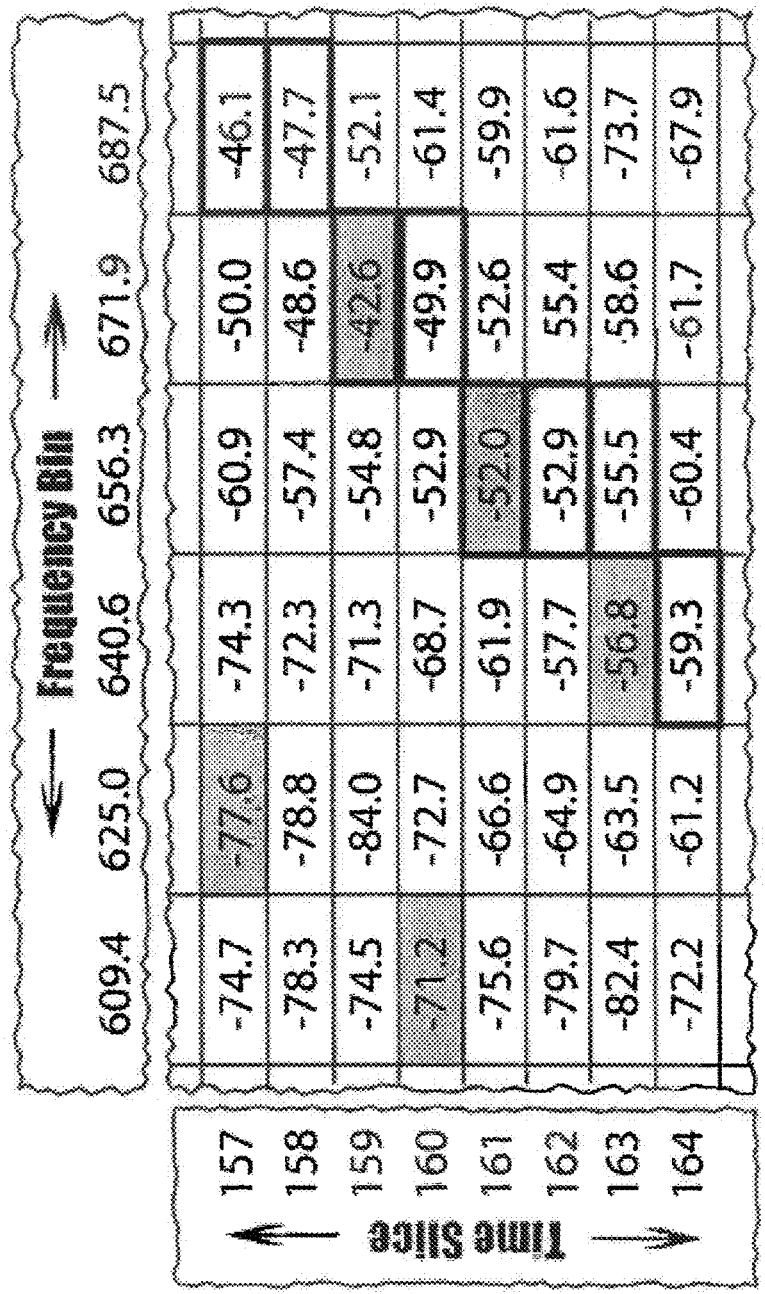
FIG. 2 shows a view of an example measuring matrix with simple maxima marked according to an exemplary embodiment of the invention.

FIG. 2 shows a view of an example measuring matrix produced by blocks 103-107 of FIG. 1 with simple maximum cells marked by blocks 108-112 of FIG. 1. For this example, a row is a time slice, and a column is a frequency bin. The number in each cell is the corresponding amplitude measurement (in dBFS). The frequency peak simple maximum cells are marked with a dark border and the time peak simple maximum cells are marked with a grey background.

For example, frequency peak simple maxima are cells in a time slice in a measuring matrix whose amplitude exceeds that of the two adjacent cells in frequency. In FIG. 2, cell (160, 671.9) is marked as a frequency peak simple maximum (with a dark border) because it has amplitude greater than adjacent cells (160, 656.3) and (160, 687.5). Similarly, time peak simple maximum cells are cells with a local maximum amplitude within a frequency bin. In FIG. 2, cell (159, 671.9) is marked as a time peak simple maximum (with a shaded background) because it has amplitude greater than adjacent cells (158, 671.9) and (160, 671.9). FIGS. 3A and 3C respectively show the signal strength of a frequency peak simple maximum and a time peak simple maximum.

Although little brothers are not marked in FIG. 2, we can see where they might be. Assume a 3 dB threshold for little brothers. Cell (160, 671.9) is marked with a dark border as a frequency peak simple maximum cell. Adjacent cells (160, 656.3) and (160, 687.5) are candidates for associated maximum cells but only cell (160, 656.3) is close enough in amplitude to qualify as an associated maximum (within 3 dB). Since its amplitude is also greater than that of cell (160, 640.6), it would be a little brother. The same determination can be made for associated maximum cells in a time slice. FIGS. 3B and 3D respectively show the signal strength of a frequency peak simple maximum with a little brother and a time peak simple maximum with a little brother.

Figure 3:
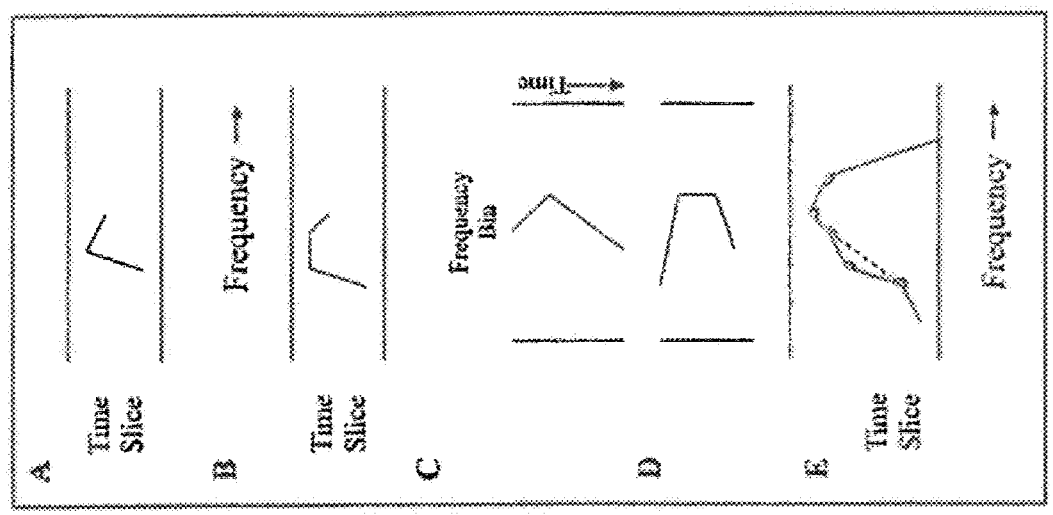
FIGS. 3A, 3B, 3C, 3D, and 3E show some of the possible categories of maxima detections according to exemplary embodiments of the invention.
FIG. 3F shows the detection of a burglar maximum by showing a signal peak entering and exiting a transform window.

FIG. 3 shows exemplary categories of maxima detections along time and frequency according to some exemplary embodiments of the invention. FIG. 3A depicts a frequency peak simple maximum. FIG. 3B depicts a frequency peak simple maximum and a little brother having almost identical amplitudes. FIG. 3C depicts a time peak simple maximum. FIG. 3D depicts a time peak simple maximum and a little brother having almost identical amplitudes.

FIG. 3E shows an angle maximum in a time slice. The third point is potentially a frequency angle maximum. Its amplitude exceeds that of the point on its left by a significant amount. Its amplitude is also slightly lower than that of the point on its right. If the difference with the point on the left is sufficiently greater than the difference with the point on the right, it is an angle maximum. For example, suppose the angle maximum threshold is 3 dB. If the third point is 5 dB greater than the point on its left but is only 1 db less than the point on its right, the difference (4 dB) exceeds the threshold and it is an angle maximum. The cell in the MM would then be marked as an angle maximum. Note that the difference threshold need not be a simple constant dB value but could be a function of frequency and amplitude. An angle maximum cell may also be a cell whose amplitude diverges from an expected convexity. An analogous time angle maximum can also be defined based on changes in time within a frequency bin.

Figure 3F:
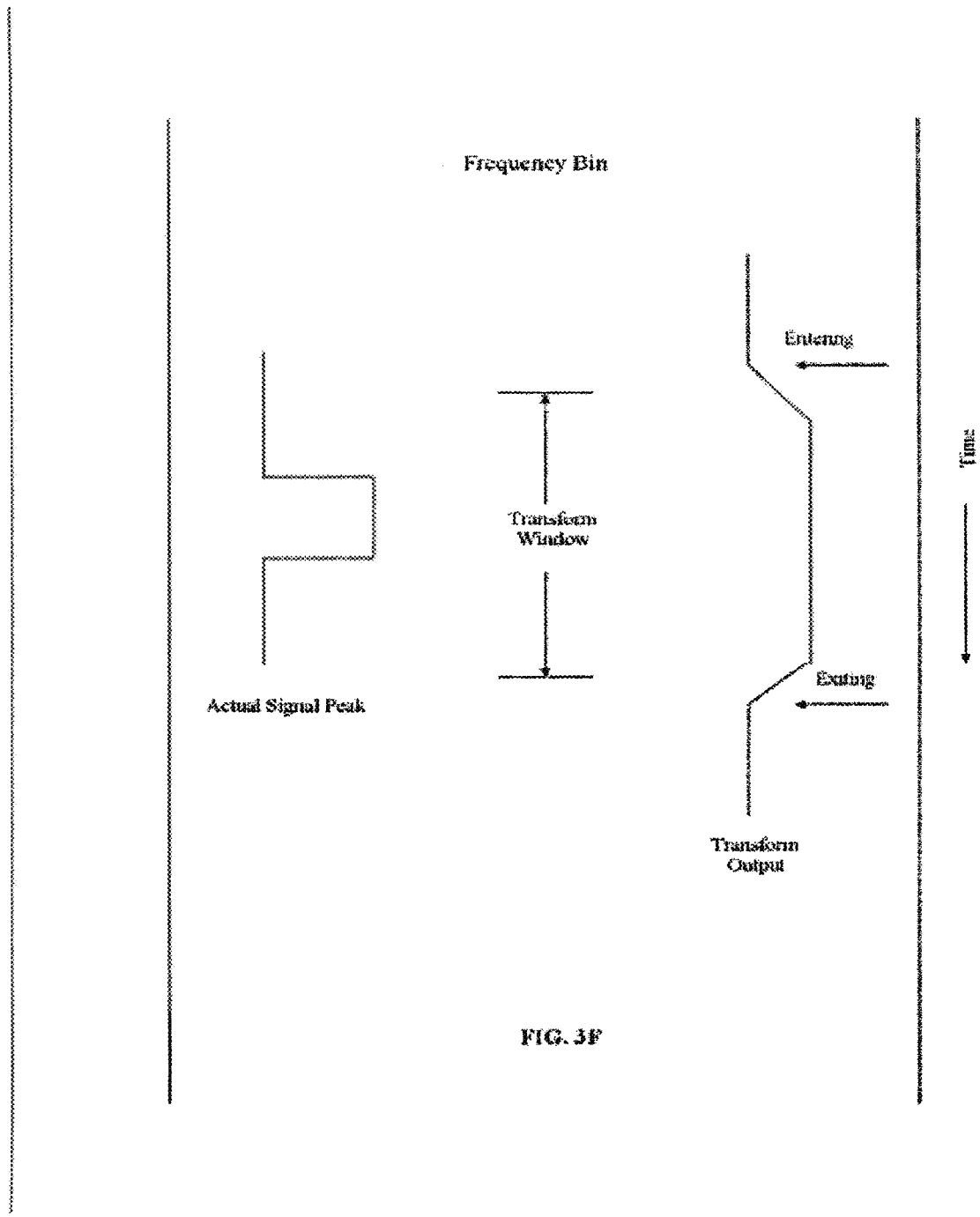

FIG. 3F illustrates the detection of a burglar maximum by showing a signal peak entering and exiting a transform window. The transform window is much wider than the peak here and so the amplitude rises (ramps up) as the peak enters, stays constant while the peak is fully inside the window, and then falls (ramps down) as the peak exits. The true width of the peak can be derived from the length of the ramps. The timing and duration of this rise and fall define the burglar maximum.

Figure 4:
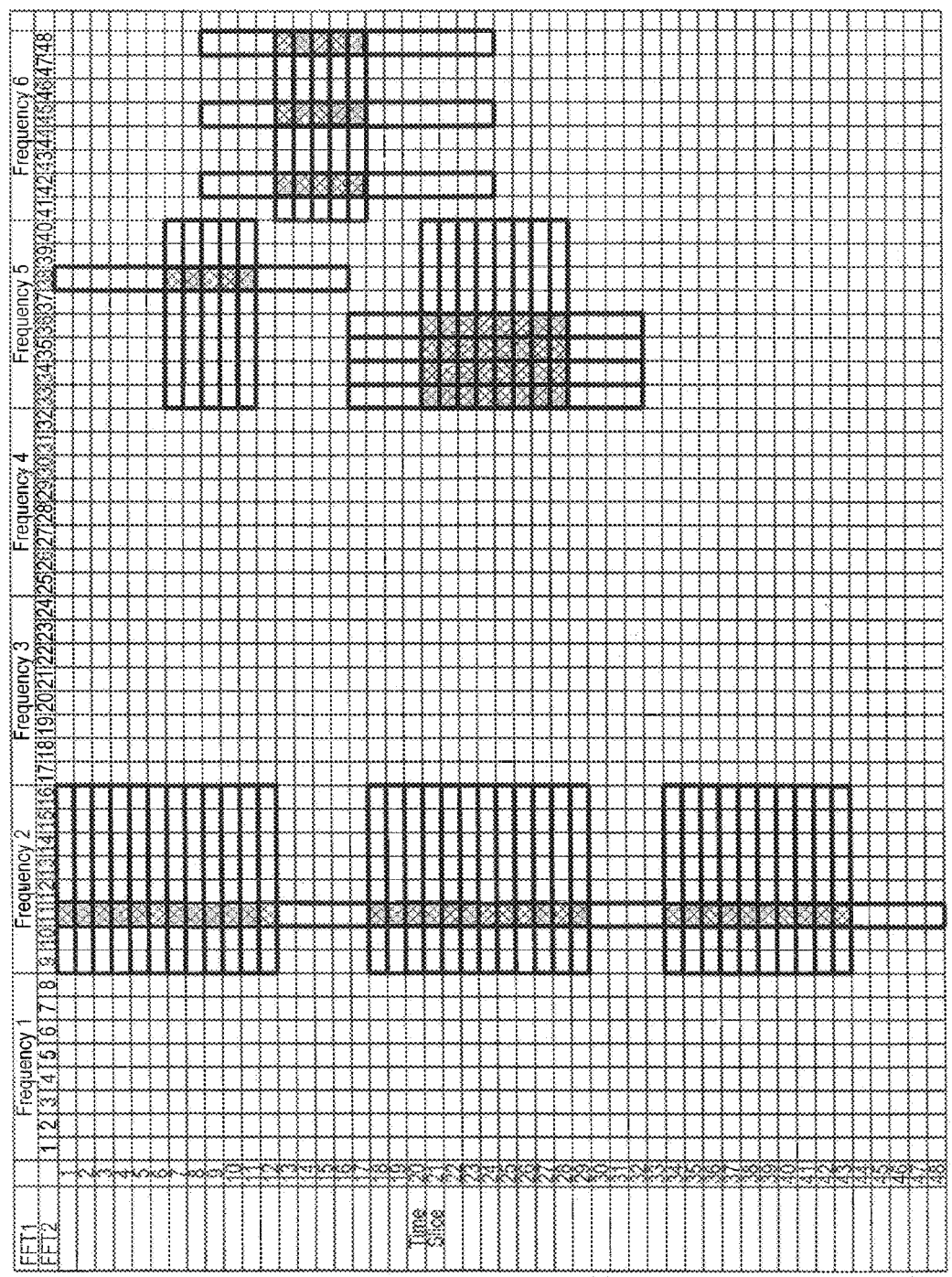
FIG. 4 shows an exemplary result of comparisons between measuring matrices to find maxima coincidences and produce a correlated maxima matrix or a Precision Measuring Matrix (PMM).

FIG. 4 shows an exemplary correlation of two measuring matrices as performed in block 113 of FIG. 1. The wider frequency bins are in a lower dimension measuring matrix (e.g., a D500MM). The maxima in this MM are shown with horizontal lines. The narrower frequency bins are in a measuring matrix with dimension 8 times as high (e.g., a D4000MM). The maxima in this MM are shown with vertical lines. The correlated maxima (where maxima in both MMs correspond in time and frequency) are shaded. These would be the maxima in the PMM of block 114 of FIG. 1.

Figure 5B:
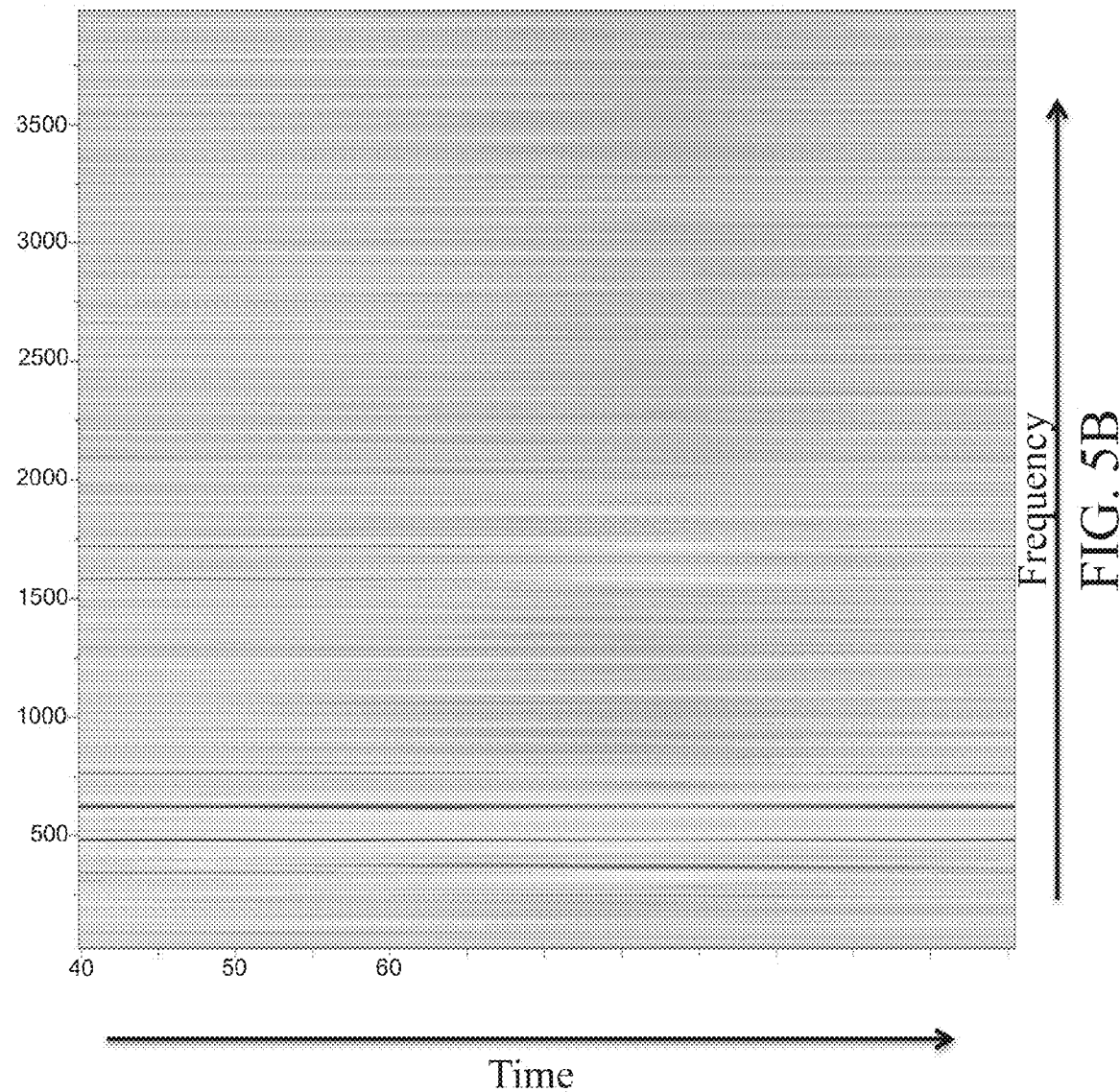

FIGS. 5A and 5B show exemplary visualizations of two measuring matrices obtained according to an exemplary embodiment of the invention. The measuring matrix of FIG. 5A was generated using an FFT of 512 sample points (i.e., a D256MM), and the measuring matrix of FIG. 5B was generated using an FFT of 4096 sample points (i.e., a D2048MM). The two measuring matrices are, for example, output from blocks 103 and 104 of FIG. 1.

Figure 5D:
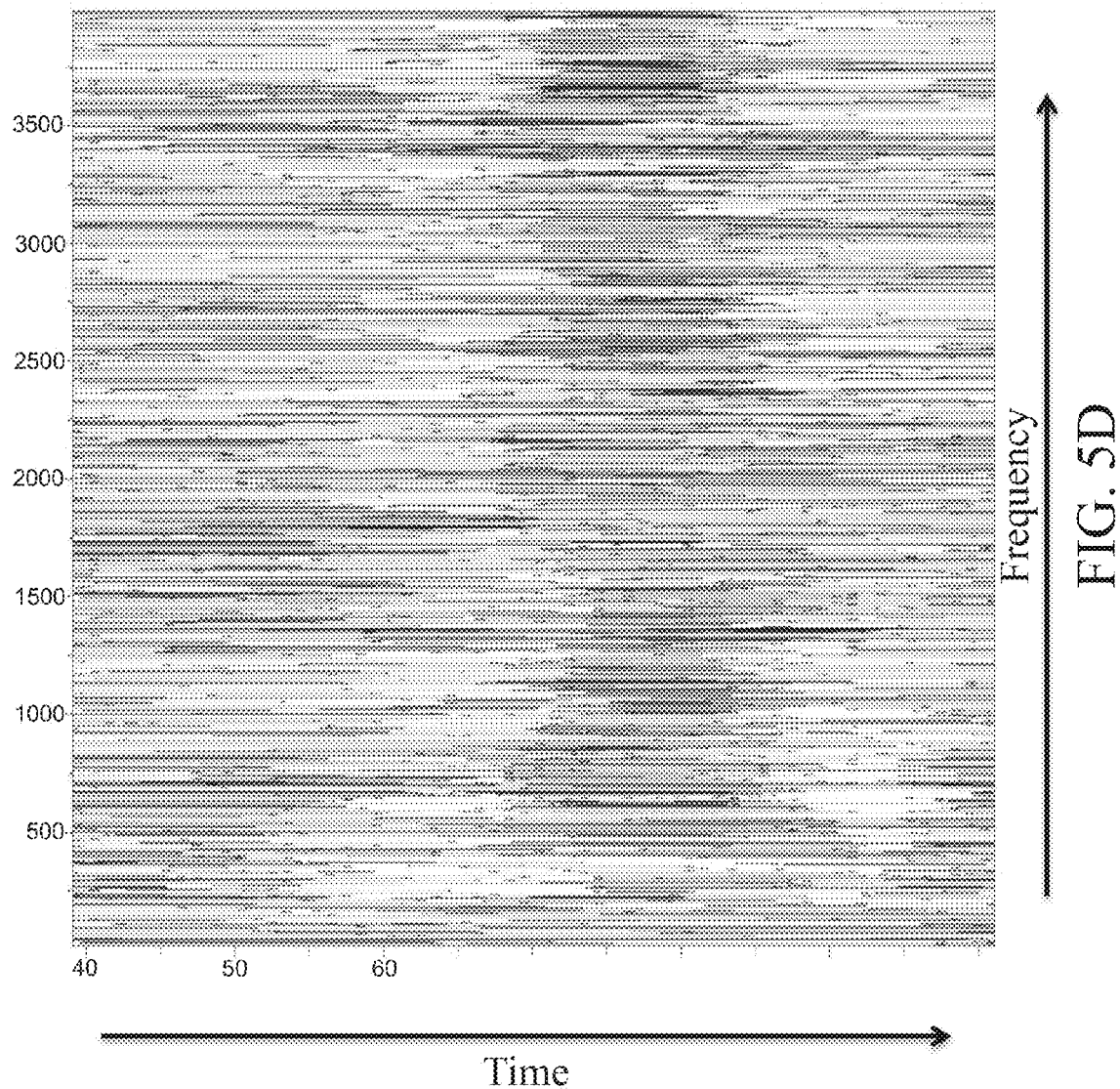

FIGS. 5C and 5D show exemplary visualizations of the maximum cells determined for the two measuring matrices of FIGS. 5A and 5B, respectively, and obtained according to an exemplary embodiment of the invention. The maximum cells of FIGS. 5C and 5D are output by, for example, blocks 108 and 109, respectively, of FIG. 1.

FIG. 5E shows an exemplary visualization of a Precision Measuring Matrix (PMM) determined from the correlating maxima shown in FIGS. 5C and 5D and obtained according to an exemplary embodiment of the invention. The PMM was obtained in block 114 of FIG. 1.

Figure 6:
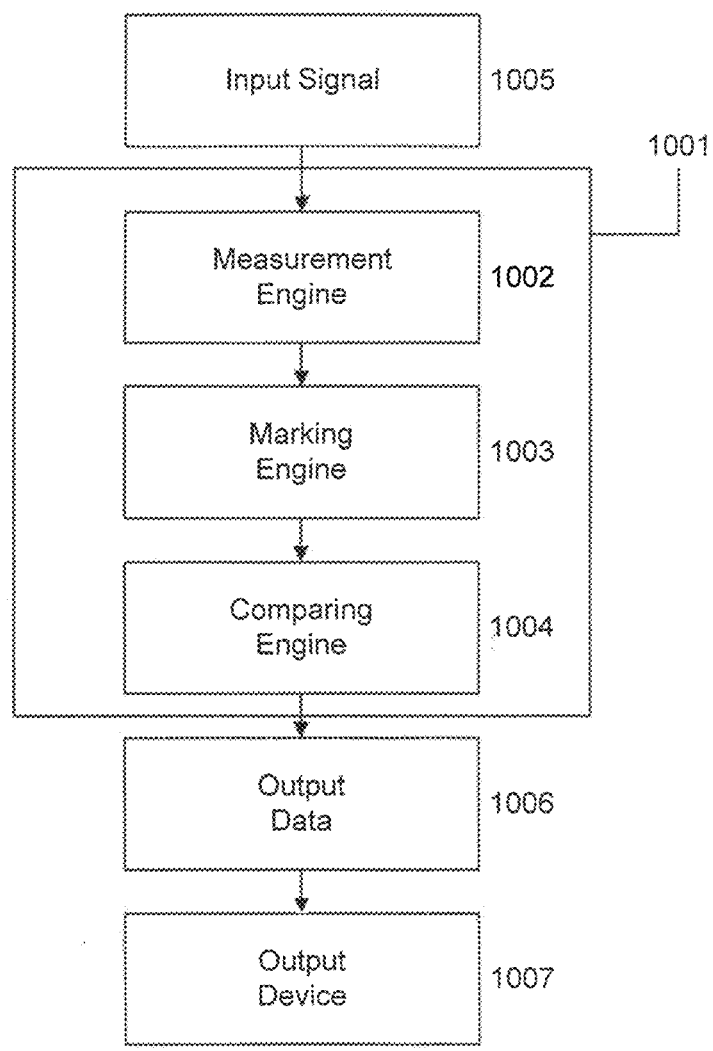
FIG. 6 shows an exemplary embodiment of the invention.

FIG. 6 shows an exemplary embodiment of the invention. Input signal 1005 is a digitized version of a physical analog signal captured by an analog device and digitized (101*a* and 101*b*) or is obtained from data storage 102. Signal processing engine 1001 processes the input signal 1005 and includes: a measurement engine 1002, a marking engine 1003, and a comparing engine 1004. Measurement engine 1002 generates MMs from input signal 1005 (implementing blocks 103 to 107 of FIG. 1). Marking engine 1003 analyzes and marks the MMs. Marking engine 1003 identifies and marks maxima in each MM (implementing blocks 108 to 115 of FIG. 1). Comparing engine 1004 identifies maximum cells in the matrices that have corresponding time and frequency and builds a PMM with the identified correlated maxima marked.

In some exemplary embodiments of the invention, signal processing module 1001 may include one or more digital processors. The one or more digital processors may interact with data storage, for example, data storage 102 of FIG. 1, etc., which may store software and/or data for use by the one or more digital processors.

Measurement engine 1002, marking engine 1003, and comparing engine 1004 may be implemented by a computer with at least one central processing unit (CPU) and a plurality of memories. Measurement engine 1002, marking engine 1003, and comparing engine 1004 may be implemented as, for example, a field programmable gated array (FPGA), a digital signal processing (DSP) chip, a graphic processing unit (GPU), an application specific integrated circuit (ASIC), etc. Measurement engine 1002, marking engine 1003, and comparing engine 1004 may be implemented in software as one or more engines and stored on computer-readable storage.

Output data 1006 is the precision measuring matrix. Output device 1007 stores, displays, and/or transmits the output data.

The invention can be embodied by software on a digital computer machine. It may run on a single processor with a single core, a single processor with multiple cores, or multiple processors with single or multiple cores. The software may implement blocks 103 to 112, or any combination thereof. The invention may be embodied using general or specialized digital signal processor chips. The invention may be embodied in dedicated hardware. The invention may be embodied on one or more circuit boards comprising, for example, digital signal processor chips, to be mounted in a computer or other device.

In an exemplary embodiment, the matrix data structure may be replaced by other data structures that can logically serve the same function. These data structures may be made up of fields. These data structures may include, but are not limited to, for example, a sparse matrix, a linked queue, etc. For example, the identified maximum cells may be represented by a sparse matrix, an identified chain of cells may be represented by a linked queue, etc.

Some exemplary embodiments may be implemented using parallel computing hardware. In an exemplary embodiment, blocks 103 to 107 and/or blocks 108 to 112 of FIG. 1 may be implemented with parallel hardware. The main memory of the parallel computer may be either shared memory (shared between all processing elements in a single address space), or distributed memory (in which each processing element has its own local address space).

The invention may have a wide range of applications, including, but not limited to, for example, signal time-variance analysis including audio, audio spectrum analysis, signal analysis in an applicable industry in any frequency range, data compression, digital cochlea for the deaf, "voice print" information, etc.

The information developed by the invention may be used to provide new or improved inputs to other signal processors, analysis devices, algorithms, systems, and organizations. Records of related partial chains running across the time-frequency plane, together with the amplitudes or interpolated amplitudes along each chain, may provide a rich and concise record of the components of particular signal sources. Signals that were previously hidden by stronger signals may be measured and visualized, particularly when the partials are linked into partial chains in the PMM visual display.

The examples and embodiments described herein are non-limiting examples. The invention is described in detail with respect to exemplary embodiments, and to those skilled in the art will now be apparent from the foregoing that changes and modifications may be made without departing from the invention in its broader aspects, and the inventor, therefore, as defined in the claims is intended to cover all such changes and modifications as fall within the true spirit of the invention.

Exemplary embodiments of the invention can be used to accurately measure sound components even when the sound components are part of a compound waveform containing a mixture of sounds. Exemplary embodiments of the invention may also be used, for example, for compound waveforms containing sounds even when the sounds come in short or long duration bursts and/or are changing in pitch and/or in amplitude.

We claim:

1. A digital signal processing system, comprising:
   a measurement engine configured to transform a digital representation of a waveform signal into a plurality of measurement matrices, each measurement matrix having a plurality of cells, each cell representing a corresponding time slice and frequency bin and having an amplitude corresponding to a signal energy for that frequency bin and time slice;
   a marking engine configured to identify and mark one or more maximum cells in each measurement matrix; and
   a comparing engine configured to identify, as correlated maxima cells, maximum cells across the plurality of measurement matrices that coincide in at least one of time and frequency, and to build a precision measuring matrix that marks the correlated maxima cells.

2. The digital signal processing system of claim 1, wherein the measurement engine is further configured to transform the digital representation by applying, to the digital representation, one or more of: a digital Fourier Transform, a discrete wavelet transform, a finite impulse response filter, or an infinite impulse response filter.

3. The digital signal processing system of claim 1, wherein the comparing engine is further configured to identify, as correlated maxima cells, maximum cells across the plurality of measurement matrices that coincide in both time and frequency.

4. The digital signal processing system of claim 1, wherein the comparing engine is further configured to link the correlated maxima cells as partial chains.

5. The digital signal processing system of claim 1, further comprising:
   an analog receiving device configured to capture an analog waveform signal; and
   an analog-to-digital (A/D) converter configured to convert the captured analog waveform signal into the digital representation of the waveform signal.

6. The digital signal processing system of claim 1, further comprising:
   a data storage device configured to store the digital representation of the waveform signal.

7. The digital signal processing system of claim 1, wherein the waveform signal is an audio waveform signal.

8. The digital signal processing system of claim 1, wherein the waveform signal is an image or video signal.

9. The digital signal processing system of claim 1, further comprising an output device configured to output the precision measuring matrix.

10. The digital signal processing system of claim 9, wherein the output device is a visualization device configured to display a visualization of the precision measuring matrix.

11. The digital signal processing system of claim 1, wherein the one or more maximum cells in each measurement matrix are simple maximum cells based on their having a local maximum amplitude.

12. The digital signal processing system of claim 1, wherein the one or more maximum cells in each measurement matrix are time peak simple maximum cells.

13. The digital signal processing system of claim 1, wherein the one or more maximum cells in each measurement matrix are frequency peak simple maximum cells.

14. The digital signal processing system of claim 1, wherein each of the plurality of measurement matrices has a different dimension.

15. The digital signal processing system of claim 1, wherein at least two of the plurality of measurement matrices have a same dimension but were transformed using different transformation techniques.

16. The digital signal processing system of claim 1, wherein the waveform signal is a compound waveform signal.

17. A digital signal processing system, comprising:
a receiver that receives a digital representation of a waveform signal;
a processing unit that transforms a digital representation of a waveform signal into a plurality of measurement matrices, each measurement matrix having a plurality of cells, each cell representing a corresponding time slice and frequency bin and having an amplitude corresponding to a signal energy for that frequency bin and time slice;
an analyzer that identifies and marks one or more maximum cells in each measurement matrix;
a comparator that identifies, as correlated maxima cells, maximum cells across the plurality of measurement matrices that coincide in time and frequency, and builds a precision measuring matrix that marks the correlated maxima cells; and
a transmitter that transmits the precision measuring matrix to an output device or a storage device.

18. The digital signal processing system of claim 17, wherein:
the receiver is an analog receiver that receives an analog version of the waveform signal, and
the digital processing system further comprises an analog-to-digital converter that converts the analog version of the waveform signal into the digital representation of the waveform signal.

19. The digital signal processing system of claim 17, wherein the transmitter transmits a visual representation of the precision measuring matrix to an output device.

20. The digital signal processing system of claim 19, wherein the output device is a display device.

21. The digital signal processing system of claim 17, wherein the processing unit transforms the digital representation by applying, to the digital representation, one or more of: a digital Fourier Transform, a discrete wavelet transform, a finite impulse response filter, or an infinite impulse response filter.

22. The digital signal processing system of claim 17, wherein the comparator identifies, as correlated maxima cells, maximum cells across the plurality of measurement matrices that coincide in both time and frequency.

23. The digital signal processing system of claim 17, wherein the comparator links the correlated maxima cells a partial chains.

24. The digital signal processing system of claim 17, wherein the waveform signal is an audio waveform signal.

25. The digital signal processing system of claim 17, wherein the waveform signal is an image or video signal.

26. The digital signal processing system of claim 17, wherein the one or more maximum cells in each measuring matrix are simple maximum cells based on their having a local maximum amplitude.

27. The digital signal processing system of claim 17, wherein the one or more maximum cells in each measurement matrix are time peak simple maximum cells.

28. The digital signal processing system of claim 17, wherein the one or more maximum cells in each measurement matrix are frequency peak simple maximum cells.

29. The digital signal processing system of claim 17, wherein each of the plurality of measurement matrices has a different dimension.

30. The digital signal processing system of claim 17, wherein at least two of the plurality of measurement matrices have a same dimension but were transformed using different transformation techniques.

31. The digital signal processing system of claim 17, wherein the waveform signal is a compound waveform signal.

* * * * *

UNITED STATES PATENT AND TRADEMARK OFFICE
CERTIFICATE OF CORRECTION

PATENT NO. : 9,600,445 B2
APPLICATION NO. : 14/137175
DATED : March 21, 2017
INVENTOR(S) : Smith et al.

It is certified that error appears in the above-identified patent and that said Letters Patent is hereby corrected as shown below:

At Column 16, Line 25, Claim 23 please delete "maxima cells a" and insert -- maxima cells as --.

Signed and Sealed this
Seventeenth Day of April, 2018

Andrei Iancu
*Director of the United States Patent and Trademark Office*